US012312755B1

(12) United States Patent
Sullivan

(10) Patent No.: US 12,312,755 B1
(45) Date of Patent: May 27, 2025

(54) HIGH COLLISION FORCE RESISTANT GATE

(71) Applicant: Foster Fence, Ltd., Houston, TX (US)

(72) Inventor: Wayne A Sullivan, Houston, TX (US)

(73) Assignee: FOSTER FENCE, LTD., Houston, TX (US)

( * ) Notice: Subject to any disclaimer, the term of this patent is extended or adjusted under 35 U.S.C. 154(b) by 0 days.

(21) Appl. No.: 18/411,884

(22) Filed: Jan. 12, 2024

(51) Int. Cl.
*E01F 13/04* (2006.01)
*E06B 11/02* (2006.01)
*E06B 11/04* (2006.01)
*E05C 3/00* (2006.01)

(52) U.S. Cl.
CPC .......... *E01F 13/048* (2013.01); *E06B 11/026* (2013.01); *E06B 11/045* (2013.01); *E05C 3/004* (2013.01)

(58) Field of Classification Search
None
See application file for complete search history.

(56) References Cited

U.S. PATENT DOCUMENTS 1,601,311 A * 9/1926 Matt ........................ E01F 13/06 49/366
3,476,425 A * 11/1969 Chartrand ............. E05B 13/002 292/DIG. 32
4,202,427 A * 5/1980 Sada ........................ E21B 19/00 182/2.1
4,610,109 A * 9/1986 Ruigrok .............. E05D 15/0617 49/427
4,705,426 A * 11/1987 Perea .................... E01F 13/123 404/6
5,673,810 A * 10/1997 Rothrock .................. E05F 1/02 220/264
6,857,227 B2 * 2/2005 Russell ................... E01F 13/06 49/49
7,121,041 B2 * 10/2006 Anderson ............ E01F 13/048 256/73
8,033,053 B2 * 10/2011 Anderson ............ E01F 13/048 404/6
8,182,169 B2 * 5/2012 Thompson ............ E01F 13/123 404/9
10,227,742 B2 * 3/2019 Neusch ................. E01F 13/024
11,428,508 B2 * 8/2022 Neusch ................... E01F 15/14
2008/0226391 A1 * 9/2008 Phillips ................. E01F 13/048 404/6

(Continued)

*Primary Examiner* — Catherine A Kelly
(74) *Attorney, Agent, or Firm* — Chamberlain, Hrdlicka, White, Williams & Aughtry P.C.; Aly Z. Dossa

(57) ABSTRACT

Techniques described herein relate to a method for installing a gate. The gate may include a gate body moveable between a gate open position and a gate closed position; a locking component configured to move between a locking open position and a locking closed position, wherein the locking component is configured to prevent the gate body from moving from the gate closed position to the gate open position when the locking component is in the locking closed position a plurality of grounding agents, wherein at least a first grounding agent of the grounding agents is coupled to the locking component; wherein, when a collision force is applied to a side of the gate body, at least two of the plurality of grounding agents and the locking component are configured to maintain the gate in the gate closed position.

20 Claims, 7 Drawing Sheets

(56) References Cited

U.S. PATENT DOCUMENTS

| | | | | |
|---|---|---|---|---|
| 2010/0024307 | A1* | 2/2010 | Dale | E01F 13/048<br>49/404 |
| 2013/0270842 | A1* | 10/2013 | Martin | E05C 3/34<br>292/210 |
| 2016/0002870 | A1* | 1/2016 | Younce | E01F 13/06<br>49/13 |
| 2023/0203767 | A1* | 6/2023 | Impero | E01F 15/043<br>404/6 |

* cited by examiner

HIGH COLLISION FORCE RESISTANT GATE

BACKGROUND

Users may desire to secure areas using any combination of fences, walls, and gates. Users may use gates that, when closed, prevent trespassers from entering into the secured area, but that may be opened to allowed permitted persons to enter the secured area. However, traditional gates may be susceptible to high collision forces applied to the front of the gates to break the gates, thereby allowing trespassers to enter the secured area.

DETAILED DESCRIPTION

Specific embodiments will now be described with reference to the accompanying figures.

In general, embodiments of the invention herein relate to a system for a high collision force resistant gate. Users may desire to secure areas using any combination of fences, walls, and gates. Users may use gates that, when closed, prevent trespassers from entering into the secured area, but that may be opened to allowed permitted persons to enter the secured area. However, traditional gates may be susceptible to high collision forces applied to the front or rear of the gates to break the gates, thereby allowing trespassers to enter the secured area. For example, trespassers may ram through a gate by colliding a vehicle (car, van, truck, etc.) with the gate to gain unpermitted entry into the secured area and thus conduct nefarious activities within such as stealing cars or other objects.

To address, at least in part, the aforementioned issues, embodiments disclosed herein relate to a high collision force resistant gate. The gate may include an I-beam gate body coupled to a hook locking component, grounding agents, and a bumper. The gate may be adapted to withstand collision forces between 1,000 Newtons and 500,000 Newtons, 5,000 Newtons and 50,000 Newtons, and 50,000 Newtons to 100,000 Newtons. Thus, the gate may be adapted to prevent cars or other objects from colliding through the gate to gain unpermitted entry into an area secured by the gate.

Figure 1A:
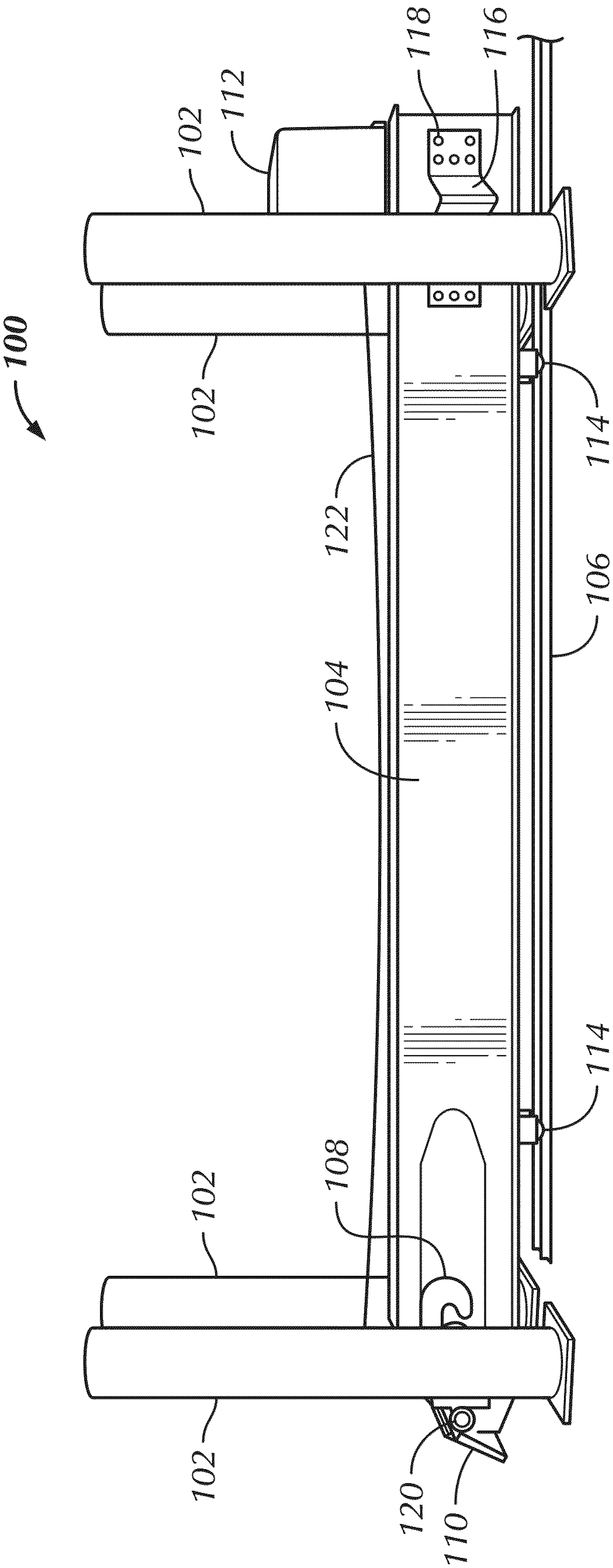
FIG. 1A shows a front view of a gate in a gate closed position in accordance with one or more embodiments disclosed herein.
Figure 1B:
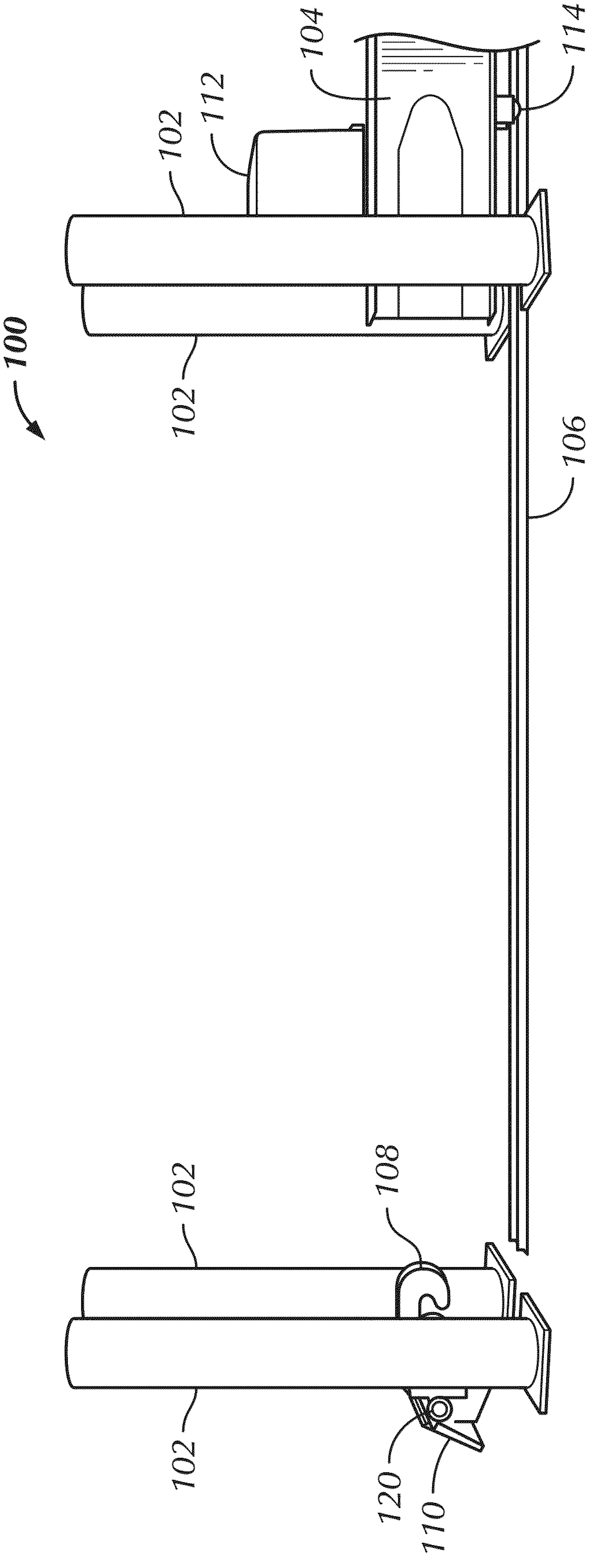
FIG. 1B shows a front view of a gate in a gate open position in accordance with one or more embodiments disclosed herein.
Figure 1C:
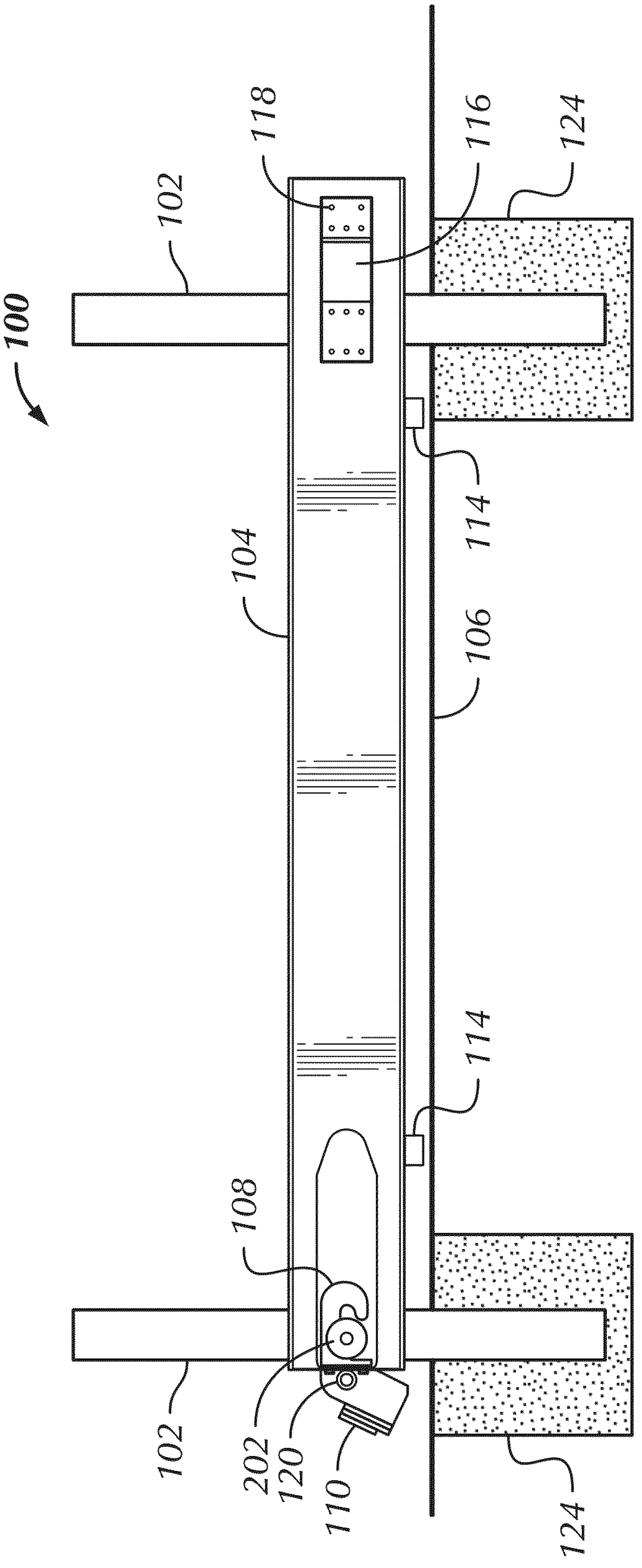
FIG. 1C shows a schematic front view of a gate in a gate closed position in accordance with one or more embodiments disclosed herein.

FIG. 1A shows a front view of a gate (100) in a gate closed position in accordance with one or more embodiments disclosed herein. FIG. 1B shows a front view of the gate (100) in a gate open position in accordance with one or more embodiments disclosed herein. FIG. 1C shows a schematic view of the gate (100) in a gate closed position in accordance with one or more embodiments disclosed herein. The gate/components shown in FIGS. 1A-1C and described below are each only one example of a particular device/component. One having ordinary skill in the art, and the benefit of this Detailed Description, will appreciate that the techniques described herein may apply to any number of different gates and/or components. Accordingly, embodiments described herein should not be considered limited to the gate and/or components shown in FIGS. 1A-1C.

As shown in FIG. 1A, the gate (100) may include one or more components (e.g., 102, 104, 106, 108, 110, 112, 114, 116, 118, 120, 122). The gate (100) may include other and/or additional components without departing from the embodiments disclosed herein. Each of these components is described below.

In one or more embodiments disclosed herein, the gate (100) includes grounding agents (102). In one or more embodiments disclosed herein, the grounding agents (102) are adapted to directly or indirectly contact the gate body (104, discussed below) of the gate when a collision force is applied to the front or back of the gate body (104). The grounding agents (102) may directly or indirectly contact the gate body (104) without the collision force applied to the front of the gate body (104) without departing from embodiments disclosed herein. In one or more embodiments disclosed herein, the grounding agents (102) are further adapted to absorb at least a portion of a collision force applied to the front or back of the gate body (104) and prevent the gate body (104) from moving past the grounding agents (102) when acted upon by the collision force. In other words, the grounding agents (102) may aid, at least in part, in preventing the collision force supplier (e.g., vehicle, human, etc.) from passing through the gate (100) when the collision force is applied to the front or back of the gate body (104) of the gate. In one or more embodiments, the grounding agents (102) may be anchored into the ground. The grounding agents (102) may be anchored into the ground using any appropriate anchoring and/or grounding technique(s) without departing from embodiments disclosed herein. For example, the grounding agents may be fastened to the ground (e.g., bolted to the ground using one or more bolts, washers, nuts, etc.), partially buried beneath the ground, partially encased in cement underneath the ground, etc. The grounding agents (102) may include posts, walls, etc.

In one or more embodiments disclosed herein, the grounding agents (102) may be embedded, buried, or otherwise anchored in grounding (124). In one or more embodiments disclosed herein, the grounding (124) is adapted to further ground the grounding agents (102). The grounding (124) may include ground underneath the surface of the Earth, concrete, reinforcement bars, adhesive, and/or any other materials or components that ground the grounding agents (102) without departing from embodiments disclosed herein.

In one or more embodiments disclosed herein, each grounding agent of the grounding agents (102) is constructed as a single component. In other embodiments disclosed herein, each grounding agent of the grounding agents (102) is any number of components coupled together to form each grounding agent. In one or more embodiments, the grounding agents (102) may be constructed of any material (e.g., cement, polymer, metal, etc.) or any combination of materials without departing from embodiments disclosed herein.

In one or more embodiments disclosed herein, the gate (100) includes a gate body (104). In one or more embodiments disclosed herein, the gate body (104) is adapted to absorb, at least in part, a collision force applied to the front or back of the gate body (104). In one or more embodiments, the gate body (104) may directly or indirectly contact one or more grounding agents (102) when the collision force is applied to the gate body (104), and the gate body (104) transfers at least a portion of the collision force to the grounding agents (102). In one or more embodiments disclosed herein, the gate body (104) is an I-beam. The I-beam may be a structural component with an I-shaped or H-shaped cross-section. The I-beam may include horizontal elements (i.e., flanges) and vertical elements (i.e., web). The gate body (104) may be other similar structural components such as H-beams, w-beams, universal beams, rolled steel joists, double T-beams, etc. without departing from embodiments disclosed herein. In one or more embodiments disclosed herein, the gate body (104) is made of carbon steel, alloy steel, and/or stainless steel. The gate body (104) may be made of any grade of steel without departing from embodiments disclosed herein. For example, the gate body (104) may include grades of A36, A529, A572, 1020, 1045, or 4130 for carbon steel, grades of 4140, 4150, 4340, 9310, and 52100 for alloy steel, or grades of 304, 316, 410, and 420 for stainless steel. The gate body (104) may include a yield strength between 20,000 pounds per square inch (psi) to 75,000 psi without departing from embodiments disclosed herein.

In one or more embodiments disclosed herein, the gate body (104) is constructed as a single component. In other embodiments disclosed herein, the gate body (104) is any number of components coupled together to form the gate body (104). In one or more embodiments, the gate body (104) may be constructed of any material (e.g., polymer, metal, etc.) or any combination of materials without departing from embodiments disclosed herein.

In one or more embodiments disclosed herein, the gate (100) includes a track (106). In one or more embodiments, the track (106) may be adapted to guide the horizontal movement of the gate body (104) when the gate body (104) moves between the gate open position and the gate closed position. The track (106) may directly or indirectly (e.g., through one or more wheels (discussed below)) contact the gate body (104) and prevent the gate body (104) from moving anywhere but between the gate closed position and the gate open position. The track (106) may include a V-track, a double V-track, or any other kind of track (106) without departing from embodiments disclosed herein. In one or more embodiments disclosed herein, the gate body (104) is constructed as a single component. In other embodiments disclosed herein, the track (106) is any number of components coupled together to form the track (106). In one or more embodiments, the track (106) may be constructed of any material (e.g., polymer, metal, etc.) or any combination of materials without departing from embodiments disclosed herein.

In one or more embodiments disclosed herein, the gate (100) includes a hook locking component (108). In one or more embodiments disclosed herein, the hook locking component (108) is adapted to rotate about a rotational member (120), discussed below) between the hook open position and the hook closed position. In one or more embodiments disclosed herein, when the hook locking component (108) is in the hook closed position, as shown in FIG. 1A, the hook locking component (108) is adapted to directly or indirectly contact or otherwise engage the gate body (104) or a component of the gate body (104) and prevent horizontal movement of the gate body (104). The hook locking component (108) may further be adapted to absorb at least a portion of the collision force applied to the front or back of the gate body (108). The hook locking component (108) may yet still be adapted to transfer, directly or indirectly, at least a portion of the collision force to one or more of the grounding agents (102). The hook locking component (108) may include a counterweight (110, discussed below) that aids in rotating the hook locking component (108) from the hook closed position to the hook open position and prevents the hook locking component (108) from rotating to the hook closed position when in the hook open position. When the gate body (104) moves into the gate closed position, the gate body (104) may push on the hook locking component (108) in such a way that the rotational force provided by the counterweight (110) is overcome by the gate body (104) and the hook locking component (108) rotates from the hook open position to the hook closed position.

Figure 5A:
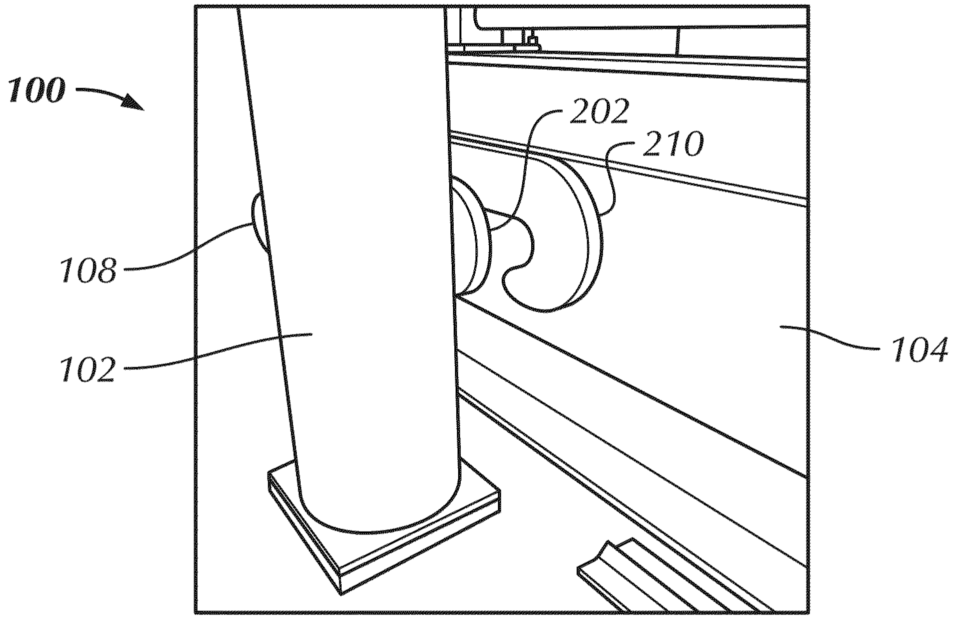
FIG. 5A shows a first perspective view of a hook locking component of a gate in a gate closed position in accordance with one or more embodiments disclosed herein.
Figure 5B:
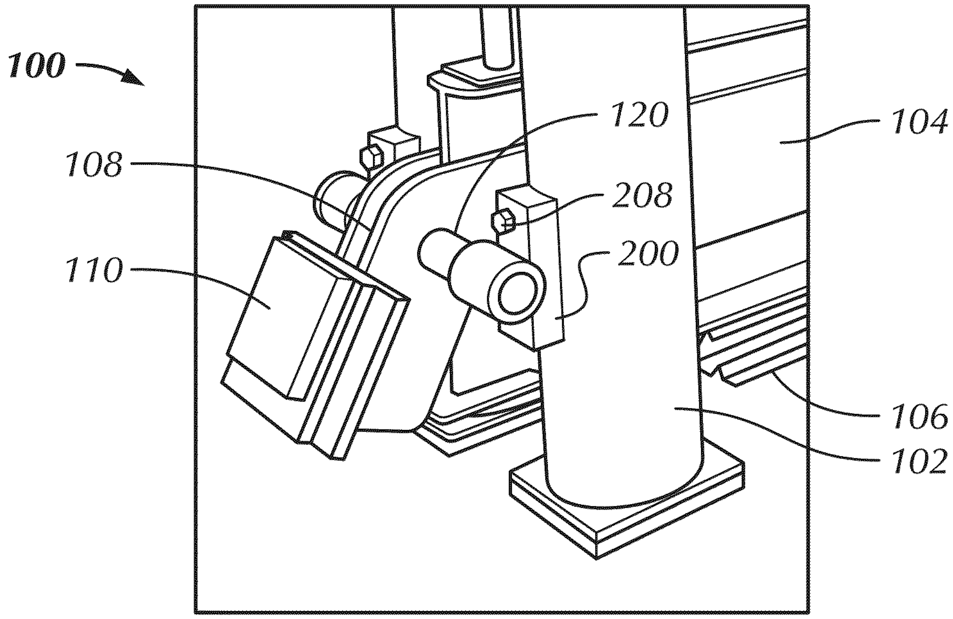
FIG. 5B shows a second perspective view of a hook locking component of a gate in a gate closed position in accordance with one or more embodiments disclosed herein.

In one or more embodiments disclosed herein, the hook locking component (108) is constructed as a single component. In other embodiments disclosed herein, the hook locking component (108) is any number of components coupled together to form the hook locking component (108). In one or more embodiments, the hook locking component (108) may be constructed of any material (e.g., polymer, metal, etc.) or any combination of materials without departing from embodiments disclosed herein. For additional information regarding the hook locking component (108) and/or components of the hook locking component (108), refer to FIG. 2 and FIGS. 5A-5B.

In one or more embodiments disclosed herein, the gate (100) includes a counterweight (110). In one or more embodiments disclosed herein, the counterweight (110) is directly or indirectly coupled to the hook locking component (108). As discussed above, the counterweight (110) may be adapted to aid in rotating the hook locking component (108) from the hook closed position to the hook open position and may be further adapted to prevent the hook locking component (108) from rotating to the hook closed position when in the hook open position. When the gate body (104) moves into the gate closed position, the gate body (104) may engage the hook locking component (108) in such a way that the horizontal movement of the gate body (104) causes rotational motion of the counterweight (110), thereby causing the hook locking component (108) to rotate from the hook open position to the hook closed position. A force may be applied to the counterweight (110) (e.g., by a human manually pushing on the counterweight (110), by a device such as an actuator causing, either directly or indirectly, a rotational force on the counterweight (110), etc.) to cause the hook locking component (108) to rotate about the rotational member (120).

In one or more embodiments disclosed herein, the counterweight (110) is constructed as a single component. In other embodiments disclosed herein, the counterweight (110) is any number of components coupled together to form the counterweight (110). In one or more embodiments, the counterweight (110) may be constructed of any material (e.g., polymer, metal, etc.) or any combination of materials without departing from embodiments disclosed herein.

Figure 2:
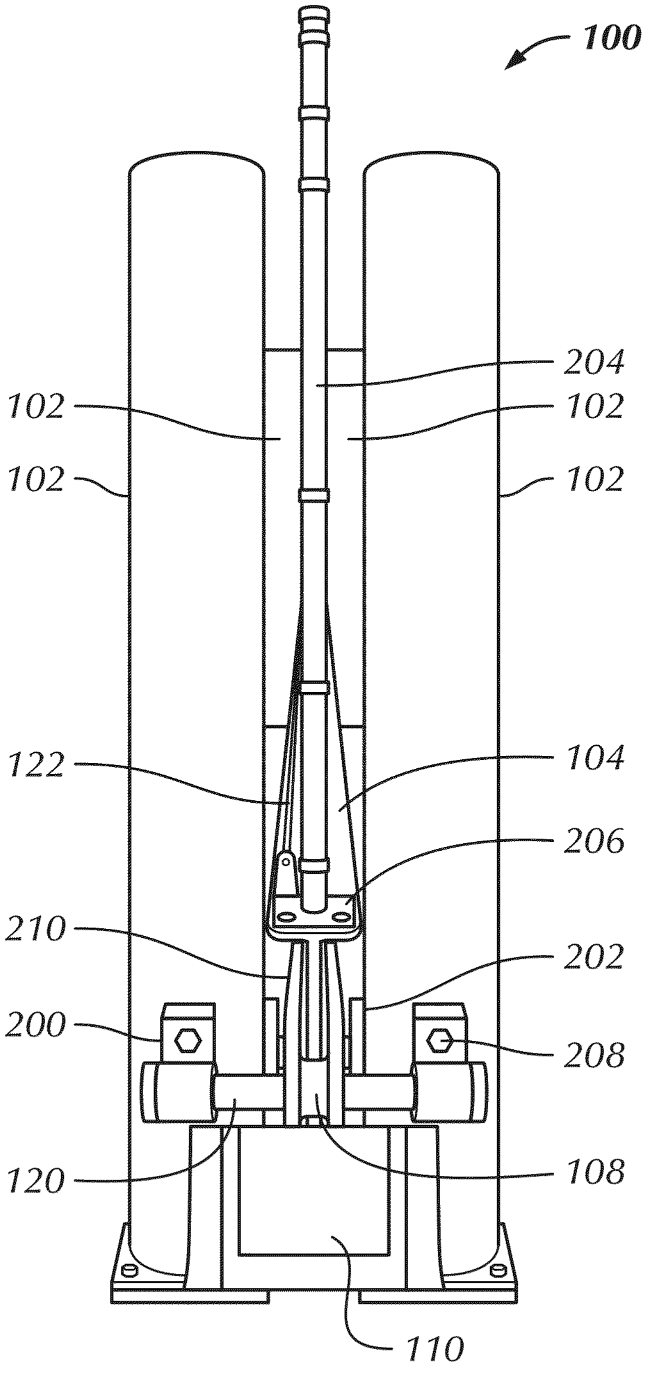
FIG. 2 shows a side view of a gate in a gate closed position in accordance with one or more embodiments disclosed herein.
Figure 3:
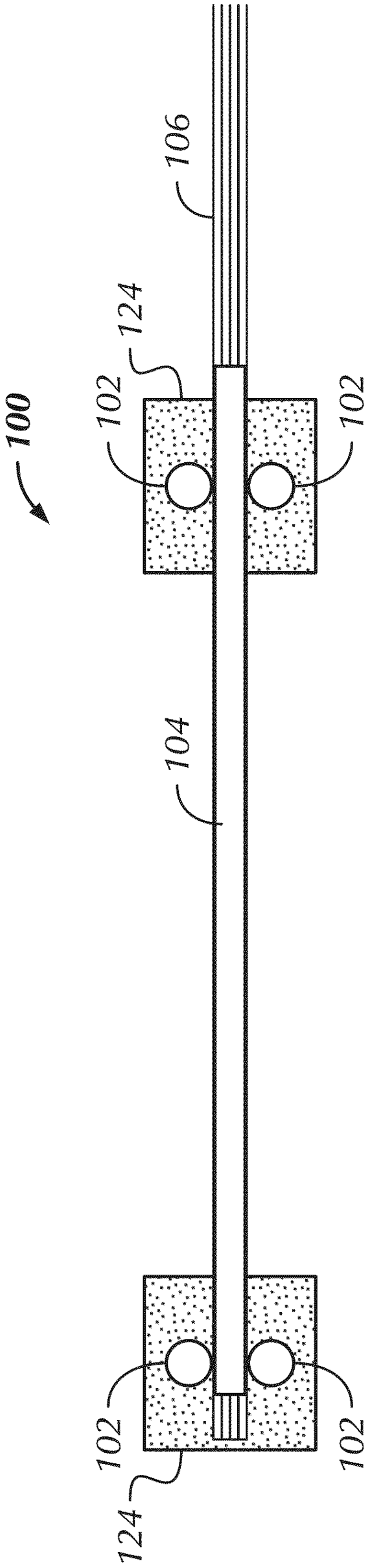
FIG. 3 shows a top view of a gate in a gate closed position in accordance with one or more embodiments disclosed herein.
Figure 4:
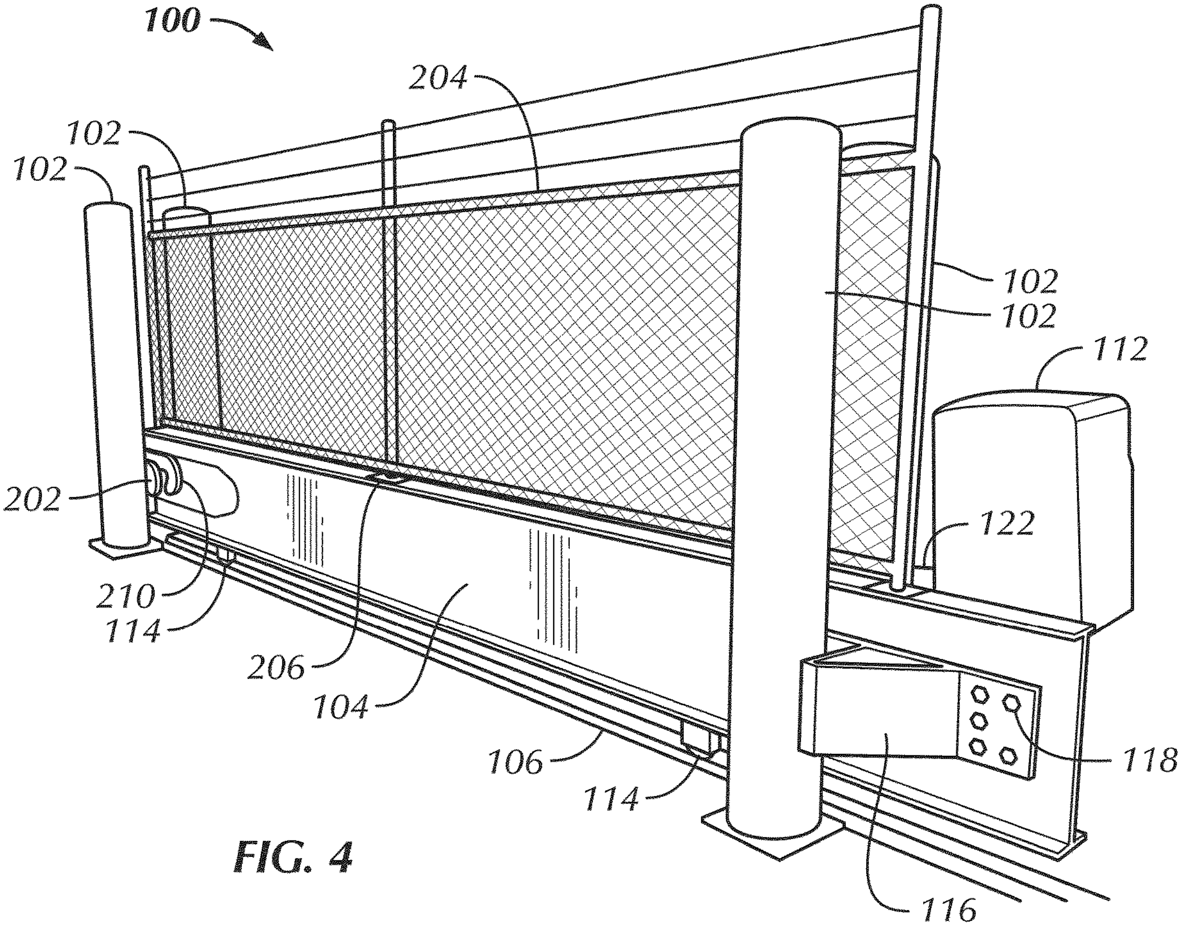
FIG. 4 shows a perspective view of a gate in a gate closed position in accordance with one or more embodiments disclosed herein.

In one or more embodiments disclosed herein, the gate (100) includes a hook engager (202). In one or more embodiments disclosed herein, the hook engager (202) is adapted to be coupled to the gate body (104). In one or more embodiments disclosed herein, the hook engager (202) is adapted to engage with or contact the hook (210, discussed below in FIG. 2) of the hook locking component (108). In other words, the hook (210) may wrap around the hook engager (202). Accordingly, the hook engager (202) engages the gate body (104) with the hook locking component (108). Thus, when the hook locking component (108) is in the hook closed position and the gate body (104) is in the gate closed position, the hook engager (202), in conjunction with the hook (210) of the hook locking component (108), may prevent horizontal movement of the gate body (104). In one or more embodiments, there may be a single hook engager (202) on one side of the gate body (104) that contacts or engages with a single hook (210) of the hook locking component (108). In alternative embodiments, as shown in FIG. 2, there may be a two hook engagers (202) on either side of the gate body (104) that contacts or engages with a two hooks (210) of the hook locking component (108) on each side of the gate body (104).

In one or more embodiments disclosed herein, the hook engager (202) is constructed as a single component. In other embodiments disclosed herein, the hook engager (202) is any number of components coupled together to form the hook engager (202). In one or more embodiments, the hook engager (202) may be constructed of any material (e.g., polymer, metal, etc.) or any combination of materials without departing from embodiments disclosed herein.

In one or more embodiments disclosed herein, the gate (100) includes a gate mover (112). In one or more embodiments disclosed herein, the gate mover (112) may be a device adapted to move the gate body (104) between the gate open position and the gate closed position. The device may be a mechanical device or an electromechanical device without departing from embodiments disclosed herein. For example, the gate mover (112) may be a structure that includes a motor coupled to a chain (122), which is coupled to the gate body (104). When the motor actuates, the motor may pull the chain (122) which in turn pulls the gate body (104) in a horizontal direction to move between the gate closed position to the gate open position. The direction of the motor actuation determines whether the gate body (104) moves toward the gate closed position or the gate open position. The gate mover (112) may include other and/or additional components associated with moving the gate body (104) such as gears, radio frequency receivers, buttons, chain housing structures, etc. without departing from embodiments disclosed herein.

In one or more embodiments disclosed herein, the gate mover (112) is constructed as a single component. In other embodiments disclosed herein, the gate mover (112) is any number of components coupled together to form the gate mover (112). In one or more embodiments, the gate mover (112) may be constructed of any material (e.g., polymer, metal, etc.) or any combination of materials without departing from embodiments disclosed herein.

In one or more embodiments disclosed herein, the gate (100) includes wheels (114). In one or more embodiments disclosed herein, the one or more wheels (114) may be coupled to the gate body (104) to enable the gate body to move along the track (106). The wheels (114) may further be adapted to fit within the shape of the track (106) or otherwise engage the track (106). For example, for a v-groove track, the wheels (114) may be v-groove wheels.

In one or more embodiments disclosed herein, the gate (100) includes a bumper (116). In one or more embodiments disclosed herein, the bumper (116) is coupled (e.g., via bolts, welds, etc.) to the gate body (104). In one or more embodiments disclosed herein, the bumper (116) is integral to the gate body (104). The bumper (116) may be situated at the end of the gate body (104) opposite from the hook locking component (108). In one or more embodiments disclosed herein, the bumper (116) is adapted to contact the at least one of the grounding agents (102) when a collision force is applied to the front or back of the gate body (104). The bumper (116) may absorb at least a portion of the collision force and transfer at least a portion of the collision force to the at least one grounding agents (102). Additionally, the bumper (116) may prevent additional horizontal movement of the gate body (104) in one direction by contacting at least one of the grounding agents (102). For example, the bumper (116) may extend out from the gate body (104) and contact a side of a grounding agent (102) when the gate body (104) reaches a certain position (e.g., the gate closed position). In such a scenario, by contacting the side of the grounding agent (102), the bumper (116) may prevent the gate body (104) from continuing further in the gate closing direction.

In one or more embodiments disclosed herein, the gate (100) includes bumper fasteners (118). As discussed above, the bumper (116) may be coupled to the gate body (104). In one or more embodiments disclosed herein, the bumper fasteners (118) are adapted to couple the bumper (116) to the gate body (104). There may be any quantity of bumper fasteners (118) without departing from embodiments disclosed herein. The bumper fasteners (118) may include, for example, any combination of bolts, nuts, and/or washers. The bumper fasteners (118) may include other and/or additional components for coupling the bumper (116) to the gate body (104) such as nails, screws, adhesives, welding or soldering materials, etc. without departing from embodiments disclosed herein.

In one or more embodiments disclosed herein, each of the bumper fasteners (118) is constructed as a single component. In other embodiments disclosed herein, each of the bumper fasteners (118) is any number of components coupled together to form the bumper fasteners (118). In one or more embodiments, the bumper fasteners (118) may be constructed of any material (e.g., polymer, metal, etc.) or any combination of materials without departing from embodiments disclosed herein.

In one or more embodiments disclosed herein, the gate (100) includes a rotational member (120). As discussed above, the gate (100) may include a hook locking component (108) that rotates between a hook closed position and a hook open position. In one or more embodiments disclosed herein, the rotational member (120) provides the axis, which extends through the length of the rotational member (120), about which the hook locking component (108) rotates. The rotational member (120) may include a shaft, pin, or a rod coupled to the hook locking component (108) and at least one of the grounding agents (102). The rotational member (120) may include other components that enable rotation and provide a rotational axis without departing from embodiments disclosed herein.

In one or more embodiments disclosed herein, the rotational member (120) is constructed as a single component. In other embodiments disclosed herein, the rotational member (120) is any number of components coupled together to form the rotational member (120). In one or more embodiments, the rotational member (120) may be constructed of any material (e.g., polymer, metal, etc.) or any combination of materials without departing from embodiments disclosed herein.

While FIGS. 1A-1C show a configuration of components, other configurations may be used without departing from the scope of embodiments described herein. For example, the gate (100) and the gate components (102, 104, 106, 108, 110, 112, 114, 116, 118, 120, 122) may each be of any shape and/or size. Accordingly, embodiments disclosed herein should not be limited to the configuration of components shown in FIGS. 1A-1C.

FIG. 2 shows a side view of the gate (100) in a gate closed position in accordance with one or more embodiments disclosed herein. The gate (100) is the gate (100, FIGS. 1A-1C) discussed above. The gate/components shown in FIG. 2 and described below are each only one example of a particular device/component. One having ordinary skill in the art, and the benefit of this Detailed Description, will appreciate that the techniques described herein may apply to any number of different gates and/or components. Accordingly, embodiments described herein should not be considered limited to the gate and/or components shown in FIG. 2.

As shown in FIG. 2, the gate (100) may include one or more components (e.g., 102, 104, 108, 110, 120, 122, 200, 202, 206, 208, 210). The grounding agents (102), the gate body (104), the hook locking component (108), the counterweight (110), the rotational member (120), the chain (122), and the hook engager (202) have been discussed above in reference to FIGS. 1A-1C. The additional components not described above will now be described in detail.

In one or more embodiments disclosed herein, the gate (100) includes a lock grounding agent (200). In one or more embodiments disclosed herein, the lock grounding agent (200) is adapted to be coupled to at least one of the grounding agents (102) and the rotational member (120). In one or more embodiments disclosed herein, the lock grounding agent (200) is adapted to couple the rotational member (120) and, indirectly, the hook locking component (108), to the grounding agent (102). The locking grounding agent (200) may be adapted to absorb at least a portion of the collision force. The lock grounding agent (200) may also be adapted to transfer at least a portion of the collision force from the hook locking component (108) and the rotational member (120) to the grounding agent (102). The lock grounding agent (200) may be a strap or any other component or components that may couple the rotational member (120) to a grounding agent (102). Although shown in FIG. 2 as including two lock grounding agents (200), there may be any quantity of lock grounding agents without departing from embodiments disclosed herein.

In one or more embodiments disclosed herein, the lock grounding agent (200) is constructed as a single component. In other embodiments disclosed herein, the lock grounding agent (200) is any number of components coupled together to form the lock grounding agent (200). In one or more embodiments, the lock grounding agent (200) may be constructed of any material (e.g., polymer, metal, etc.) or any combination of materials without departing from embodiments disclosed herein.

In one or more embodiments disclosed herein, the gate (100) includes a gate fence (204). In one or more embodiments disclosed herein, the gate fence (204) is coupled to the top of the gate body (104). In one or more embodiments disclosed herein, the gate fence (204) may be adapted to prevent entities (e.g., humans, animals, objects, etc.) from passing over the gate body (104) and through the gate (100) when the gate body (104) is in the gate closed position. The gate fence (204) may include, for example, one or any combination of, a chain link fence, a wooden fence, a plastic fence, a metal fence, a barbed wire fence. The gate fence (204) may include other and/or additional types of fences without departing from embodiments disclosed herein.

In one or more embodiments disclosed herein, the gate fence (204) is constructed as a single component. In other embodiments disclosed herein, the gate fence (204) is any number of components coupled together to form the gate fence (204). In one or more embodiments, the gate fence (204) may be constructed of any material (e.g., polymer, metal, etc.) or any combination of materials without departing from embodiments disclosed herein.

In one or more embodiments disclosed herein, the gate (100) includes gate fence fasteners (206). As discussed above, the gate fence (204) may be coupled to the gate body (104). In one or more embodiments disclosed herein, the gate fence fasteners (206) are adapted to couple the gate fence (204) to the gate body (104). There may be any quantity of gate fence fasteners (206) without departing from embodiments disclosed herein. The gate fence fasteners (206) may include, for example, any quantity of bolts, nuts, and/or washers. The gate fence fasteners (206) may include other and/or components for coupling the gate fence (204) to the gate body (104) such as nails, screws, adhesives, welding or soldering materials, etc. without departing from embodiments disclosed herein.

In one or more embodiments disclosed herein, each of the gate fence fasteners (206) is constructed as a single component. In other embodiments disclosed herein, each of the gate fence fasteners (206) is any number of components coupled together to form the gate fence fasteners (206). In one or more embodiments, the gate fence fasteners (206) may be constructed of any material (e.g., polymer, metal, etc.) or any combination of materials without departing from embodiments disclosed herein.

In one or more embodiments disclosed herein, the gate (100) includes lock grounding fasteners (208). As discussed above, the rotational member (120) may be coupled to a grounding agent (102). In one or more embodiments disclosed herein, the lock grounding fasteners (208) are adapted to couple the rotational member (120), and indirectly the hook locking component (108), to the grounding agent (102). There may be any quantity of lock grounding fasteners (208) without departing from embodiments disclosed herein. The lock grounding fasteners (208) may include, for example, any quantity of bolts, nuts, and/or washers. The lock grounding fasteners (208) may include other and/or components for coupling the rotational member (120) to the grounding agent (102) such as nails, screws, adhesives, welding or soldering materials, etc. without departing from embodiments disclosed herein.

In one or more embodiments disclosed herein, each of the lock grounding fasteners (208) is constructed as a single component. In other embodiments disclosed herein, each of the lock grounding fasteners (208) is any number of components coupled together to form the lock grounding fasteners (208). In one or more embodiments, the lock grounding fasteners (208) may be constructed of any material (e.g., polymer, metal, etc.) or any combination of materials without departing from embodiments disclosed herein.

In one or more embodiments disclosed herein, the gate (100) includes a hook (210). As discussed above, the hook locking component (108) may include a hook (210). In one or more embodiments disclosed herein, the hook (210) may be coupled to the hook locking component (108). In one or more embodiments disclosed herein, the hook (210) is adapted to engage with, or otherwise contact the hook engager (202). Accordingly, the hook (210) engages with the hook engager (202) thus engaging the gate body (104) with the hook locking component (108). Therefore, when the hook locking component (108) is in the hook closed position and the gate body (104) is in the gate closed position, the hook (210), in conjunction with the hook engager (202) of the hook locking component (108), may prevent horizontal movement of the gate body (104). In one or more embodiments, there may be a single hook engager (202) on one side of the gate body (104) that contacts or engages with a single hook (210) of the hook locking component (108). In alternative embodiments, as shown in FIG. 2, there may be a two hook engagers (202) on either side of the gate body (104) that contacts or engages with a two hooks (210) of the hook locking component (108) on each side of the gate body (104).

In one or more embodiments disclosed herein, the hook (210) is constructed as a single component. In other embodiments disclosed herein, the hook (210) is any number of components coupled together to form the lock grounding fasteners (208). In one or more embodiments, the hook (210) may be constructed of any material (e.g., polymer, metal, etc.) or any combination of materials without departing from embodiments disclosed herein.

While FIG. 2 shows a configuration of components, other configurations may be used without departing from the scope of embodiments described herein. For example, the gate (100) and the gate components (e.g., 102, 104, 108, 110, 120, 122, 200, 202, 206, 208, 210) may each be of any shape and/or size. Accordingly, embodiments disclosed herein should not be limited to the configuration of components shown in FIG. 2.

In one or more embodiments, the gate (100) also includes a locking member that locks the gate body (104), either directly or indirectly, to one or more of the grounding agents (102). For example, a lock may couple to a portion of the gate body (104) and a portion of the hook locking component (108) to lock the gate in the gate closed position, thereby preventing a bad actor from pushing the gate from the gate closed position to the gate open position.

In one or more embodiments, the configuration of the gate (100) provided above is capable of withstanding collision forces between 1,000 Newtons and 500,000 Newtons, 5,000 Newtons and 50,000 Newtons, 50,000 Newtons to 100,000 Newtons, and any other force that may be cause by a vehicle colliding with the gate (100). As defined herein, "collision force" refers to a force associated with a force caused by a vehicle attempting to break through a gate and includes forces in excess of 30,000 Newtons and less than 1 million Newtons. The amount of collision force that the gate (100) is capable of withstanding depends on the size and material chosen for each of the components described above, and may be customized to fit the needs of an owner seeking to secure an area. In the event of a collision cause by a bad actor attempting to break through the gate (100) (e.g., via someone ramming the gate with a vehicle), the configuration of the gate (100) described above, causes the gate to remain in the gate closed position, thereby denying entry to the bad actor.

FIGS. 3-5B illustrate alternative views of the gate (100) to provide alternate angles of various components of the gate (100). Each of the components illustrated in FIGS. 3-5B have been discussed above and these figures provide alternate angles to provide the reader with a better understanding of the configuration and operation of the gate (100).

In the above description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named or similarly numbered components. Additionally, in accordance with various embodiments described herein, any description of the components of a figure is to be interpreted as an optional embodiment, which may be implemented in addition to, in conjunction with, or in place of the embodiments described with regard to a corresponding like-named or similarly numbered component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

As used herein, words that express a certain direction (e.g., forward, reverse, front, back, rear, etc.) are not intended to express that a component of a riser cage is coupled to particular side of component. Instead, such terms are intended to convey a side of the component relative to other components in a given figure, and/or to describe components that may be located on different sides of another component (e.g., top versus side).

As used herein, the phrase coupled to means that two or more components are coupled using any form of direct and/or indirect coupling between two or more components without departing from the invention.

While a limited number of embodiments have been described herein, those skilled in the art, having benefit of this disclosure, will appreciate that other embodiments can be devised which do not depart from the scope of the embodiments described herein. Accordingly, the scope of embodiments described herein should be limited only by the attached claims.

What is claimed is:

1. A gate, comprising:

a gate body moveable between a gate open position and a gate closed position;

a hook locking component comprising a hook and configured to contact the gate body at a first end of the gate body, wherein:

the hook locking component is configured to rotate about a rotational axis between a hook open position and a hook closed position, wherein the hook locking component is configured to rotate from the hook open position to the hook closed position when contacted by the gate body, and wherein the rotational axis is orthogonal to a direction of movement of the gate body and a vertical axis, the hook is configured to prevent the gate body from moving from the gate closed position to the gate open position when the hook locking component is in the hook closed position, and the hook further comprises:

a first hook engager configured to contact the gate body on a first side; and a second hook engager configured to contact the gate on a second side, opposite the first side;

a plurality of grounding agents, wherein at least a first grounding agent of the grounding agents is coupled to the hook locking component;

a bumper coupled to a second end of the gate body, opposite of the first end, wherein the bumper is configured to contact a second grounding agent of the grounding agents, wherein, when a collision force is applied to a side of the gate body, at least two of the plurality of grounding agents, the bumper, and the hook locking component are configured to maintain the gate in the gate closed position;

a gate mover, wherein the gate mover is configured to move the gate body between the gate closed position and the gate open position; and a track, wherein the track is configured to guide the gate body to move between the open position and the closed position.

2. The gate of claim 1, wherein at least a portion of each of the plurality of grounding agents extend into the ground and are configured to absorb at least a portion of the collision force.

3. The gate of claim 1, wherein the hook locking component further comprises a counterweight configured to aid in moving the hook locking component from the hook closed position to the open position.

4. The gate of claim 3, wherein the hook locking component is configured to be manually operated between the hook closed position and the open position.

5. The gate of claim 4, wherein the hook locking component comprises a shaft, wherein the rotational axis extends through a length of the shaft.

6. The gate of claim 1, further comprising a gate fence coupled to a top side of the gate body.

7. The gate of claim 6, wherein the gate fence comprises at least one selected from a group consisting of:

a chain link fence, a wooden fence, a plastic fence, a metal fence, and a barbed wire fence.

8. The gate of claim 1, wherein the collision force is configured to exceed at least 50,000 Newtons.

9. A gate, comprising:

a gate body moveable between a gate open position and a gate closed position;

a locking component configured to rotate about a rotational axis between a locking open position and a locking closed position, wherein the locking component is configured to prevent the gate body from moving from the gate closed position to the gate open position when the locking component is in the locking closed position, and wherein the rotational axis is orthogonal to a direction of movement of the gate body and a vertical axis;

a plurality of grounding agents, wherein at least a first grounding agent of the grounding agents is coupled to the locking component; and a bumper coupled to a second end of the gate body, opposite of a first end, wherein the bumper is configured to contact a second grounding agent of the grounding agents, wherein, when a collision force is applied to a side of the gate body, at least two of the plurality of grounding agents, the bumper, and the locking component are configured to maintain the gate body in the gate closed position.

10. The gate of claim 9, wherein at least a portion of each of the plurality of grounding agents extend into the ground and are configured to absorb at least a portion of the collision force.

11. The gate of claim 9, wherein the locking component further comprises a counterweight configured to aid in moving the locking component from the locking closed position to the locking open position.

12. The gate of claim 11, wherein the locking component is configured to be manually operated between the locking closed position and the locking open position.

13. The gate of claim 12, wherein the locking component comprises a shaft, wherein the rotational axis extends through a length of the shaft.

14. The gate of claim 9, further comprising a gate fence coupled to a top side of the gate body.

15. The gate of claim 14, wherein the gate fence comprises at least one selected from a group consisting of:

a chain link fence, a wooden fence, a plastic fence, a metal fence, and a barbed wire fence.

16. The gate of claim 9, wherein the collision force is configured to exceed at least 50,000 Newtons.

17. A gate, comprising:

a gate body moveable between a gate open position and a gate closed position;

a locking component configured to rotate about a rotation axis between a locking open position and a locking closed position, wherein the locking component is configured to prevent the gate body from moving from the gate closed position to the gate open position when the locking component is in the locking closed position, wherein the rotational axis is orthogonal to a direction of movement of the gate body and a vertical axis, and wherein the locking component further comprises:

a first hook engager configured to contact the gate body on a first side; and a second hook engager configured to contact the gate on a second side, opposite the first side;

a plurality of grounding agents, wherein at least a first grounding agent of the grounding agents is coupled to the locking component, wherein, when a collision force is applied to a side of the gate body, at least two of the plurality of grounding agents and the locking component are configured to maintain the gate body in the gate closed position.

18. The gate of claim 17, wherein the collision force is configured to exceed at least 50,000 Newtons.

19. The gate of claim 17, wherein at least a portion of each of the plurality of grounding agents extend into the ground and are configured to absorb at least a portion of the collision force.

20. The gate of claim 17, wherein the locking component further comprises a counterweight configured to aid in moving the locking component from the locking closed position to the locking open position.

* * * * *